2,970,913
PROTEIN-EMULSIFIER POWDER AND PROCESS OF PRODUCING THE SAME

Morrison Loewenstein, Ashton, Ill., assignor to Crest Foods Co., Inc., Ashton, Ill., a corporation of Illinois No Drawing. Filed May 14, 1958, Ser. No. 735,122

13 Claims. (Cl. 99—14)

This invention relates to the production of protein powders having combined therewith in a new way agents for improving the suspension characteristics of the powder. Applicant's prior application: Serial No. 715,836, filed February 17, 1958, relates to the same subject when hydrocolloids were the agents in question. The present application involves a class of emulsifiers, and also seeks broad protection aside from the specific nature of the agent used.

Protein concentrates such as those prepared from milk have become important as additives to fortify the protein content of many foods. They have also found use in the pharmaceutical field. The preferred concentrates are generally prepared by simultaneous precipitation from skim milk under acid conditions, the solids in the curd thus formed containing about 85% protein in the form of a mixture of casein and lactalbumin, together with a small amount of beta lactoglobulin. This precipitate is sometimes referred to as a casein-lactalbumin fusion or coprecipitate. The lactose and a portion of the minerals formerly present in the milk are carried off in the whey.

The protein in milk is present as a colloidal suspension. Even the smallest particles are of a sufficient size so that they normally would be separated from the liquid by the force of gravity. However, they are maintained in suspension by an electrostatic charge and to some degree by their absorption of water. When any of these forces are neutralized, a process generally referred to as denaturation, the particles are thrown out of the suspension. Once this has occurred, it is extremely difficult to reestablish the forces sufficiently to render the protein once more readily dispersible in an aqueous liquid.

The coprecipitated protein concentrate described above no longer possess an electrostatic charge sufficient to maintain it in a readily dispersible state when it is added to a liquid. In this form it is useful for some purposes. However, when the concentrate is to be reconstituted into the form of a suspension again, it must first be subjected to a process known as solubilizing. One such process is described in Patent No. 2,832,685. According to this process, the milk protein concentrate produced as above is heated after adding first a strong alkali and then ammonium hydroxide. This renders the powder resulting from spray-drying readily dispersible in aqueous liquid. For many purposes it may be used in this form. However, many uses demand an even better dispersibility and solubility than is possessed by the product of this process.

For many uses, a protein content considerably less than 85% is desired. To achieve a lower protein concentration, a calculated amount of concentrated skim milk or reconstituted skim milk may be added to the solubilized protein concentrate, since the protein content of skim milk solids is lower due to the presence of lactose and minerals. The addition of skim milk is performed, preferably, while the solubilized protein is still in the form of a slurry before it has been spray-dried. Although the protein concentration adjustment process produces the desired protein concentration, it may result in the deterioration of the dispersibility and solubility properties of the protein concentrate.

It is an object of the present invention to provide a process for the production of a dried milk protein concentrate and the product resulting therefrom, wherein the concentrate has improved dispersibility and solubility.

It is a further object to provide such a process and product wherein the dispersibility and solubility are improved even where the protein content has been readjusted to a value within the range of 40% to 85% of total solids.

It is a further object to provide a dried protein concentrate which has low moisture content resulting in maximum stability to bacteria, chemical, or enzymatic deterioration.

It is a further object to provide such dried products which are bland or natural in taste and lend themselves readily to blending with other materials in the manufacture of foods or pharmaceutical products.

In accordance with the present invention it has been found that if an emulsifying agent is dispersed into an aqueous slurry of a solubilized milk protein concentrate, the resulting product when dry will have greatly improved dispersibility and solubility in aqueous liquids.

The emulsifying agent should be one selected from the group consisting of polyoxyethylene esters of fatty acids, polyhydric alcohol esters of fatty acids, glycerides of fatty acids, and phospholipids. Among the suitable compounds are: triethylene glycol stearate, nonaethylene glycol stearate, their oleates, and palmitates; glycerol monostearate, glycerol distearate, mono-diglyceride (a mixture of mono- and di-glycerol esters of fatty acids), glycerol oleates, and palmitates, oleates, stearates, palmitates of sorbitan; and lecithin, cephalin and sphingomyelin.

The amount of emulsifying agent used is not critical. As little as 0.25% by weight based on total solids has been found effective for many uses. For most uses, 4.0% will be sufficient. However, in a few specific applications such as in an additive to be used as only a small proportion of ice cream mixes, amounts as much as 50% of the additive have been found beneficial.

The preferred proteins for the process are those obtained from skim milk. These proteins include casein, lactalbumin, and lactoglobulin. They may be used in the proportions in which they are present in milk or in any altered proportions, combinations, or individually. For some uses proteins obtained from plant products such as the soya bean may also be used.

Prior to adding the emulsifier the proteins should be solubilized as described below.

The emulsifier may be added directly to the solubilized protein concentrate slurry, after heating the emulsifier to melt it if necessary. Preferably, however, it is diluted with small quantities of water or skim milk. If it does not dilute readily the mixture should be heated to 150° F., and homogenized in a high pressure homogenizer, and then added to the protein concentrate slurry.

In the examples which follow, the various processes will be described for preparing the starting materials and for carrying out the process of the invention.

The example immediately following describes the preparation of a milk protein concentrate according to the method disclosed in U.S. Patent No. 2,623,083.

Example 1—Coprecipitation

Into a suitable receptacle such as a conventional cheese vat is placed freshly separated skimmed milk. The titratable acidity as measured in terms of lactic acid is adjusted downwardly to a point where the titratable acidity ranges between .08% and 0.1% by the addition of suitable alkalizing material such as sodium bicarbonate or soda ash, or a combination of the two materials. The milk is then heated to a temperature of 190° to 194° F. The application of heat is discontinued and the milk brought to a quiescent state. Dilute hydrochloric acid is added to accomplish the complete precipitation of the casein, lactalbumin, and beta lactoglobulin, in the form of a homogeneous co-precipitate.

The whey resulting from the process is withdrawn from the vat. The precipitated protein is washed with hot water until substantially a complete removal of acid, lactose and soluble salts from the curd is accomplished. The curd is then pressed free of liquid, either by centrifugal force or in a mechanical press. The curd at this point contains approximately 35% to 40% total solids.

*Example II—Solubilization*

The solubilization may be performed according to the process disclosed in Patent No. 2,832,685.

A milk protein concentrate, such as the product of Example I containing about 85% protein (dry basis), is comminuted by passing through a hammermill. The finely ground curd is then placed in an insulated digestion tank. Water is added and the tank contents are placed in continuous agitation by means of a large lightning mixer. Potassium hydroxide dissolved in cold water is slowly added to the curd in the tank. The temperature of the slurry is then raised to about 150° F. by the injection of live steam. Digestion of the alkaline slurry is allowed to continue for about two hours, or until gross disintegration of curd particles has been accomplished. The temperature of the slurry is then raised to about 175° F. by direct injection of steam, and the slurry is pumped to a mixing kettle. Ammonium hydroxide is added to the slurry in the kettle, and at least ten minutes are allowed to elapse for the reaction of the alkali with the protein. At this point the solubilized product may be dried, but if it is to be used in accordance with this invention as described below, it is more economical to use the slurry, deferring the drying until later.

The solubilized concentrate produced in Example II contains about 85% protein based on total solids. Where such a concentration is desired, the emulsifying agent may be added to this product as described in Example IV below. However, where a lower protein concentration is desired, the necessary adjustment may be made as follows.

*Example III—Protein adjustment*

The protein concentration of the concentrate produced in Example II above is adjusted by adding to the concentrate a calculated quantity of either concentrated fresh skim milk or reconstituted skim milk.

Since the protein concentration of the solubilized concentrate produced above is about 85% of the solids and the protein concentration of condensed skimmed milk is only about 36% of the solids, any final concentration from about 36% to about 85% may be obtained by adding the necessary amount of skimmed milk. The slurry is then reheated to about 175° F. by the direct injection of steam, during which period the skimmed milk is allowed to react with the highly alkaline slurry produced above in Example II. The slurry is then pumped to a reservoir vat from which it is fed into a commercial spray drier, or, if it is to be subjected to the present process, the emulsifying agent is added at this point before drying.

The process of the present invention may be carried out either upon the unmodified protein concentrate product in Example II, or may be combined together with the processes described in Example III for adjusting the protein content. The combination with the latter method is described in the following example.

*Example IV—Main step of present invention*

To 20 lbs. of skimmed milk are added 4.75 lbs. of mono-diglyceride and 0.25 lbs. of lecithin. The mixture is heated to 150° F., and homogenized with a standard high pressure homogenizer. The resulting product is then added to a calculated amount of the slurry formed in Example II to give a product containing 3% emulsifying agent based on total solids, and is spray dried.

Where the protein content is adjusted downward as in Example III by the addition of large quantities of skimmed milk, the emulsifying agent may be incorporated in the skimmed milk before incorporation with the solubilized protein. Alternatively, the emulsifier may be emulsified in a small portion of water or skimmed milk. Additionally, the emulsifier, heated if necessary to bring it into the liquid state, may be added directly to the solubilized protein slurry. When incorporating the emulsifying agent by any of these methods, better results are exhibited if the resulting mixture is then heated to a temperature of about 150° F.

*Example V—Modification*

To a slurry such as produced in either Example II or Example III, 0.5% nonaethylene glycol monostearate based on total solids is emulsified in a small portion of water or skimmed milk and added to the slurry. The mixture is heated to 150° F. Where the emulsifying agent is added to the slurry of Example II, the slurry is mixed and then spray dried. However, where additional skimmed milk has been added to lower the protein content, the mixture should be maintained at an elevated temperature for a period sufficient to allow the added protein to react with the solution before spray drying.

*Example VI—Use of dried coprecipitate*

Where the starting material used for the present process is dried form of solubilized protein concentrate of Example II, it is necessary to add sufficient water to form a slurry of the protein. The protein may be adjusted as described. The pH of the solution is then preferably adjusted to a value within the range from about 7.5 to 9.5, by the addition of a base such as ammonium hydroxide.

The method of this invention is especially desirable when the final slurry is spray dried. Spray drying is commonly used in the industry and has advantages making it almost a commercial necessity. However, it has resulted, before this invention, in a product that is less readily dispersed than is desired.

In either event there results a finely particulate product incorporating the emulsifier in an intimate manner ensuring high dispersibility.

Where a quicker dispersibility is desired, the fine particles of the dried product may be subjected to the process known as "instantizing" which constitutes agglomerating the fine powder into grape-like clusters. This allows the subsequent dissolving liquid to seep around each individual particle and wet the material more rapidly than is ordinarily possible.

The product of the present invention has a number of advantages over prior art dried protein concentrates. The wetting ability and dispersibility are greatly improved. The solubility of the dried material is also greatly improved over those containing no emulsifying agents, and even over those to which an emulsifying agent is added after drying. Additionally, reconstituted solutions from the dried product have appreciably lower viscosity than do those not containing the emulsifying agent.

Although the present invention has been described in only several of its forms, it is to be understood that many variations may be practiced by those skilled in the art without departing from the spirit or scope of the invention, except as it is limited by the appended claims.

I claim:

1. A process for the production of a milk protein concentrate having improved dispersibility and solubility, comprising dispersing an emulsifying agent selected from the group consisting of polyoxyethylene esters of fatty acids, polyhydric alcohol esters of fatty acids, glycerides of fatty acids, phospholipids, and mixtures thereof into an aqueous slurry in which the solids consist essentially of a solubilized milk protein, and spray drying the resulting mixture.

2. A process according to claim 1 wherein said emulsifying agent is nonaethylene glycol monostearate.

3. A process according to claim 1 wherein said emulsifying agent is mono-diglyceride.

4. A process according to claim 1 wherein the emulsifying agent is lecithin.

5. A process according to claim 1 wherein the emulsifying agent is a mixture of mono-diglyceride and lecithin.

6. A process for the production of a milk protein concentrate having improved dispersibility and solubility comprising dispersing an emulsifying agent selected from the group consisting of polyoxyethylene esters of fatty acids, polyhydric alcohol esters of fatty acids, glycerides of fatty acids, phospholipids, and mixtures thereof into an aqueous slurry in which the solids consist essentially of a solubilized milk protein, and treating the resulting mixture to reduce it to a dry finely particulate form.

7. A process for the production of a milk protein concentrate having improved dispersibility and solubility which comprises forming an aqueous slurry in which the solids consist essentially of a solubilized milk protein and an emulsifying agent selected from the group consisting of polyoxyethylene esters of fatty acids, polyhydric alcohol esters of fatty acids, glycerides of fatty acids, phospholipids, and mixtures thereof, and spray drying the resulting mixture.

8. A process for the production of a milk protein concentrate having improved dispersibility and solubility which comprises forming an aqueous slurry in which the solids consist essentially of a solubilized milk protein, homogenizing an emulsifying agent selected from the group consisting of polyoxyethylene esters of fatty acids, polyhydric alcohol esters of fatty acids, glycerides of fatty acids, phospholipids, and mixtures thereof, with a small portion of an aqueous liquid, adding the homogenized mixture to the slurry, heating the slurry to cause a reaction of the ingredients, and spray drying the resulting mixture.

9. A process for the production of a protein concentrate having improved dispersibility and solubility which comprises dispersing an emulsifying agent selected from the group consisting of polyoxyethylene esters of fatty acids, polyhydric alcohol esters of fatty acids, glycerides of fatty acids, phospholipids, and mixtures thereof into an aqueous slurry in which the solids consist essentially of a solubilized protein, and spray drying the resulting mixture.

10. A milk protein concentrate having improved dispersibility and solubility produced by dispersing an emulsifying agent selected from the group consisting of polyoxyethylene esters of fatty acids, polyhydric alcohol esters of fatty acids, glycerides of fatty acids, phospholipids, and mixtures thereof into an aqueous slurry in which the solids consist essentially of a solubilized milk protein and spray drying the resulting mixture.

11. A milk protein according to claim 10, wherein the emulsifying agent is nonaethylene glycol monostearate.

12. A milk protein according to claim 10, wherein said emulsifying agent is a mixture of mono-diglyceride and lecithin.

13. The method of producing a protein powder uniformly activated by a water-soluble surface active substance effective when the powder is mixed in an aqueous liquid for improving the suspension characteristics of the protein powder in aqueous liquids which comprises dissolving and thoroughly mixing said water-soluble substance in a slurry in which the solids consist essentially of said protein in water and spray drying the mixture.

References Cited in the file of this patent

UNITED STATES PATENTS

| 2,587,369 | Nash | Feb. 26, 1952 |
| 2,832,685 | Scott | Apr. 29, 1958 |

FOREIGN PATENTS

| 701,697 | Great Britain | Dec. 30, 1953 |